(12) United States Patent
Kucinskas et al.

(10) Patent No.: US 8,666,520 B2
(45) Date of Patent: Mar. 4, 2014

(54) METHODS, SYSTEMS, AND APPARATUS FOR SHEDDING LOADS FROM AN ELECTRICAL GRID

(75) Inventors: Keith Kucinskas, West Hartford, CT (US); Thomas Frederick Papallo, Jr., Farmington, CT (US); Cecil Rivers, Jr., West Hartford, CT (US)

(73) Assignee: General Electric Company, Schenectady, NY (US)

( * ) Notice: Subject to any disclaimer, the term of this patent is extended or adjusted under 35 U.S.C. 154(b) by 628 days.

(21) Appl. No.: 12/902,814

(22) Filed: Oct. 12, 2010

(65) Prior Publication Data

US 2012/0089265 A1 Apr. 12, 2012

(51) Int. Cl.
*G05B 19/42* (2006.01)

(52) U.S. Cl.
USPC .......................................................... 700/86

(58) Field of Classification Search
USPC .......................................................... 700/295
See application file for complete search history.

(56) References Cited

U.S. PATENT DOCUMENTS

| | | | |
|---|---|---|---|
| 3,706,916 A | 12/1972 | Halbeck et al. | |
| 4,075,699 A | 2/1978 | Schneider et al. | |
| 4,532,486 A | 7/1985 | Terrier | |
| 4,612,424 A * | 9/1986 | Clark et al. | 200/50.18 |
| 4,918,566 A | 4/1990 | Brodsky et al. | |
| 5,041,805 A | 8/1991 | Ohishi et al. | |
| 5,180,051 A | 1/1993 | Cook et al. | |
| 5,532,660 A | 7/1996 | Smith et al. | |
| 5,614,878 A | 3/1997 | Patrick et al. | |
| 5,838,219 A | 11/1998 | Du et al. | |
| 5,936,817 A | 8/1999 | Matsko et al. | |
| 6,507,255 B1 | 1/2003 | Ennis et al. | |
| 6,522,227 B1 | 2/2003 | Mody et al. | |
| 6,714,107 B2 | 3/2004 | Mody et al. | |
| 6,787,937 B2 | 9/2004 | Mody et al. | |
| 6,788,508 B2 | 9/2004 | Papallo, Jr. et al. | |
| 6,799,091 B2 | 9/2004 | Bradford | |
| 6,963,042 B1 | 11/2005 | Kouris | |
| 7,019,606 B2 | 3/2006 | Williams et al. | |
| 7,061,349 B2 | 6/2006 | Castonguay et al. | |
| 7,274,974 B2 * | 9/2007 | Brown et al. | 700/295 |
| 7,274,975 B2 | 9/2007 | Miller | |
| 7,310,032 B1 | 12/2007 | Kouris | |
| 7,342,474 B2 | 3/2008 | Castonguay et al. | |
| 8,120,886 B2 * | 2/2012 | Anand et al. | 361/93.2 |
| 8,204,632 B2 * | 6/2012 | Abi-Samra | 700/295 |
| 2003/0090349 A1 * | 5/2003 | Mody et al. | 335/68 |
| 2007/0064377 A1 | 3/2007 | DeBoer et al. | |
| 2007/0168088 A1 | 7/2007 | Ewing et al. | |
| 2008/0084644 A1 | 4/2008 | King | |
| 2008/0084648 A1 | 4/2008 | King | |
| 2008/0086579 A1 | 4/2008 | Williams et al. | |
| 2010/0052829 A1 * | 3/2010 | Anand et al. | 335/186 |

FOREIGN PATENT DOCUMENTS

EP 1921728 A2 4/2008

* cited by examiner

*Primary Examiner* — Mohammad Ali
*Assistant Examiner* — Sivalingam Sivanesan
(74) *Attorney, Agent, or Firm* — General Electric Company (57) ABSTRACT

A load shedding system for operating at least one circuit breaker positioned within an enclosure is described. The load shedding system includes a processor configured to receive a demand signal and to provide a predetermined load shedding signal. The load shedding system also includes at least one load shedding apparatus configured to receive the load shedding signal from the processor. The load shedding apparatus is configured to be coupled to a door of the enclosure. The load shedding apparatus is further configured to be operatively coupled to the at least one circuit breaker and further configured to actuate the at least one circuit breaker in response to the load shedding signal.

21 Claims, 7 Drawing Sheets

METHODS, SYSTEMS, AND APPARATUS FOR SHEDDING LOADS FROM AN ELECTRICAL GRID

BACKGROUND OF THE INVENTION

The embodiments described herein relate generally to electrical power distribution systems and, more specifically, to managing electricity demand.

In many regions of the world, demand for electricity is nearing electricity generation and delivery capacity. If current capacity remains the same and demand continues to rise, demand will exceed capacity. Generation and delivery capacity depends on both the amount of electricity an electrical utility is able to generate and the amount of electricity the electrical grid connecting the utility to the end users is able to deliver. If demand exceeds capacity, one result may be rolling black-outs where neighborhoods do not receive electricity during peak times of day. Another potential result is rolling brown-outs, where neighborhoods receive lower voltages, which may potentially cause damage to appliances and other equipment.

The rising demand for electricity can be satisfied by increasing electricity generation capacity by constructing new power plants which could include wind, nuclear, solar, gas, and/or coal generation technologies. To deliver the increased electricity generated, the capacity of the electrical grid may also need to be increased. Such construction is expensive and time consuming. Environmental concerns and energy price volatility are also constraints on merely adding conventional power generation facilities to meet the increasing demand.

Businesses and home owners may also install green technologies such as solar cells to generate their own electricity locally and decrease the strain on the grid. However, the upfront costs for these solutions are high, preventing widespread implementation.

Reducing demand during peak hours is another way to prevent demand for electricity from surpassing electricity generation and delivery capacity. Electricity consumption varies throughout a typical day. However, each day the electricity demand curve of electricity consumption varies in a similar manner. For example, during peak times (i.e., morning to early evening), demand for electricity is highest. Demand for electricity is significantly lower early in the morning and late at night. Power storage devices may be charged during non-peak times of the day, which increases the demand during those times of day. The power that is stored can then be used during times of peak demand. This flattens the electricity demand curve by creating a constant demand below capacity limits. However, the cost of current battery technology capable of charging to this high of an energy level is prohibitive.

Demand for electricity at peak times may be passively reduced by an electric utility by increasing the cost of electricity during peak hours. Higher energy costs may motivate customers to reduce electricity usage. This passive solution requires cooperation of the end user as well as action by the end user to remove electrical loads from the grid during peak hours. Some solutions currently exist, such as programmable thermostats, that automatically reduce usage of a high power-usage load during peak hours. Such solutions typically are very limited in the types of devices they control. Demand for electricity may also be actively reduced by an electric utility by taking action to remove electrical loads. For example, a "smart grid" allows a utility to send a signal instructing a "smart device" at a customer location to turn itself off. Typically, equipment used by electric utilities to automatically shed loads from the electric grid requires costly installation at a customer location, many times, requiring the expertise of an electrician.

BRIEF DESCRIPTION OF THE INVENTION

In one aspect, a load shedding system for operating at least one circuit breaker positioned within an enclosure is provided. The load shedding system includes a processor configured to receive a demand signal and to provide a predetermined load shedding signal. The load shedding system also includes at least one load shedding apparatus configured to receive the load shedding signal from the processor. The load shedding apparatus is configured to be coupled to a door of the enclosure. The load shedding apparatus is further configured to be operatively coupled to the at least one circuit breaker and configured to actuate the at least one circuit breaker in response to the load shedding signal.

In another aspect, a load shedding apparatus for operating at least one circuit breaker included within an enclosure is provided. The enclosure includes a door. The load shedding apparatus includes an interface member that includes a first edge and a second edge, the interface member operatively coupled to the at least one circuit breaker. The load shedding apparatus also includes an actuator configured to translate the interface member from a neutral position to a first position in response to a load shedding signal.

In yet another aspect, a method for retrofitting an electrical load center with a load shedding system is provided. The load shedding system includes a processor and at least one load shedding apparatus. The method includes configuring the processor to receive a demand signal. The method also includes communicatively coupling the processor to the at least one load shedding apparatus. The method also includes configuring the at least one load shedding apparatus to be coupled to a door of the electrical load center such that when the door is in a first door position, the at least one load shedding apparatus is operatively coupled to at least one circuit breaker within the electrical load center.

DETAILED DESCRIPTION OF THE INVENTION

The embodiments described herein include a load shedding system for use by end users in an energy production and transmission system. The system facilitates automatically managing electrical demand based on load shedding signals and/or a preset schedule.

A first technical effect of the energy production and transmission system described herein is to provide direct control of loads included within the transmission system. The first technical effect is at least partially achieved by (a) receiving a demand response signal at a processor, (b) providing a load shedding signal, generated at the processor, to at least one load shedding apparatus, and (c) actuating the load shedding apparatus from a first position to a second position in response to the load shedding signal. The direct control of loads is provided without uncoupling a circuit protection device from the source of electricity, and without interfering with normal functionality of the circuit protection device.

Figure 1:
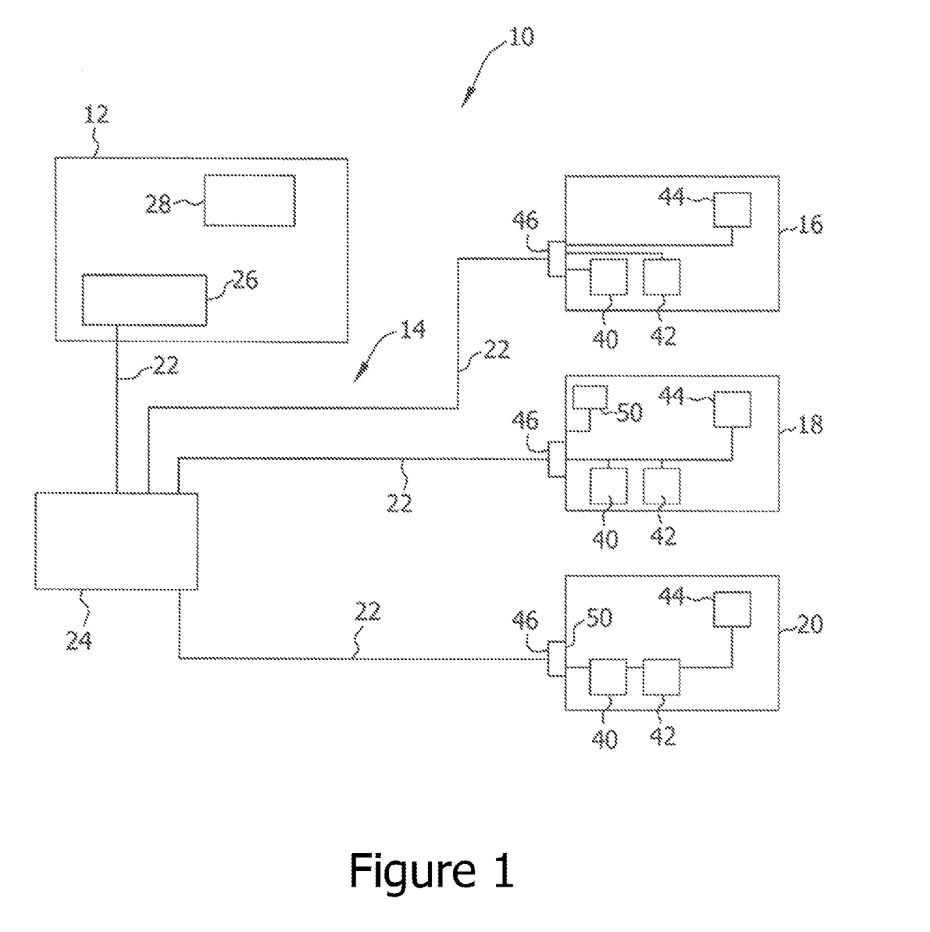
FIG. 1 is a block diagram of an exemplary energy production and transmission system that includes an electric utility, a power grid, and a plurality of customer locations.

FIG. 1 is a block diagram of an exemplary energy production and transmission system 10 that includes an electric utility 12, a power grid 14, and a plurality of customer locations 16, 18, and 20. Electricity is delivered from electric utility 12 to customer locations 16, 18, and 20 via electric power grid 14. In the exemplary embodiment, electric power grid 14 includes a plurality of transmission lines 22 and an electrical substation 24. Electric utility 12 includes an electric generator 26 that supplies electrical power to power grid 14. Generator 26 may be driven by, for example, a gas turbine engine, a hydroelectric turbine, and/or a wind turbine. Electric utility 12 also includes a computer system 28 configured to control energy production and transmission. Computer system 28 is illustrated as being included within electric utility 12, however, computer system 28 may be external to electric utility 12 (e.g., remotely located) and in communication with electric utility 12. Furthermore, although described as a computer system, computer system 28 may be any suitable processing device that enables energy production and transmission system 10 to function as described herein. In the exemplary embodiment, computer system 28 is further configured as part of a demand side load shedding system, described in more detail below.

Customer locations 16, 18, and 20 include electric loads, for example, loads 40, 42, and 44. Moreover, customer locations 16, 18, and 20 also include an enclosure. The enclosure is referred to herein as an electrical load center, and more specifically, as an electrical panel 46. Electrical panel 46 may also be referred to as a circuit breaker box or a fuse box. Loads 40, 42, and 44 are coupled to electrical panel 46. Electrical panel 46 is also coupled to power grid 14 and receives electricity for use throughout customer location 16, 18, and/or 20. Electrical panel 46 divides the electricity provided into varying values of current for delivery to individual circuits within customer location 16, 18, and/or 20, and more specifically, to loads 40, 42, and 44. Electrical panel 46 includes a plurality of circuit protection devices (not shown in FIG. 1), for example, circuit breakers and/or fuses, configured to interrupt the flow of electricity to a portion of customer location 16, 18, and/or 20 if that location is drawing more than a predefined level of current. Some circuit protection devices, for example, circuit breakers, also allow electricity to be intentionally turned off to a corresponding circuit within customer location 16, 18, and/or 20. A circuit breaker may be intentionally turned off to allow a user to perform electrical repairs in a specific location within customer location 16, 18, and/or 20, or to turn off a specific device/appliance to conserve electricity.

Figure 2:
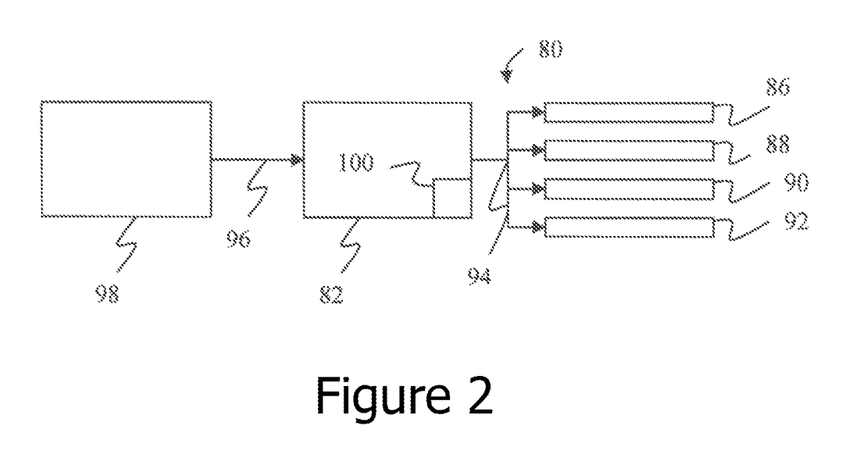
FIG. 2 is a block diagram of an exemplary load shedding system that may be included within the energy production and transmission system shown in FIG. 1.

FIG. 2 is a block diagram of an exemplary load shedding system 80 that may be included within energy production and transmission system 10 (shown in FIG. 1). Load shedding system 80 facilitates controlling operation of an electrical load center that includes at least one circuit breaker, for example, electrical panel 46 (shown in FIG. 1). The control of electrical panel 46 is provided without uncoupling the circuit breaker from electrical panel 46, and without interfering with normal functionality of electrical panel 46. Although described herein as including at least one circuit breaker, electrical panel 46 many include any other type of circuit protection device that includes an actuator lever, or other type of electrical or mechanical device, that allows a user to reset the circuit protection device and/or to manually switch the circuit protection device between an "on" state and an "off/trip" state.

In the exemplary embodiment, load shedding system 80 includes a processing device 82 communicatively coupled to at least one load shedding apparatus 84. Typically, load shedding system 80 will include a plurality of load shedding apparatus 84, for example, a first load shedding apparatus 86, a second load shedding apparatus 88, a third load shedding apparatus 90, and a fourth load shedding apparatus 92. Load shedding apparatus 84 are coupled to a door (shown in FIG. 4) of electrical panel 46 and are operatively coupled to at least one circuit breaker actuator lever (shown in FIG. 4) within electrical panel 46. Each load shedding apparatus 48 is of an appropriate size and geometry that every circuit breaker included within electrical panel 46 may be outfitted with a load shedding apparatus 48.

Although illustrated as including four load shedding apparatus 84, load shedding system 80 may include any number of load shedding apparatus that allow load shedding system 80 to function as described herein. In the exemplary embodiment, the number of load shedding apparatus 84 corresponds to a number of circuit breaker actuator levers (shown in FIG. 4) that load shedding system 80 is configured to control. In an alternative embodiment, multiple load shedding apparatus 84 are operatively coupled to a single circuit breaker actuator lever, and work in unison to operate the circuit breaker actuator lever. Furthermore, the term processor, or processing device, as used herein, refers to central processing units, microprocessors, microcontrollers, reduced instruction set circuits (RISC), application specific integrated circuits (ASIC), logic circuits, and any other circuit or processor capable of executing the functions described herein.

In the exemplary embodiment, processing device 82 generates a load shedding signal 94 in response to a demand signal 96 from a demand signaling device 98. In the exemplary embodiment, demand signaling device 98 is controlled by electric utility 12 (shown in FIG. 1). For example, demand signaling device 98 may be controlled by, or included within, computer system 28 (shown in FIG. 1). When electric utility 12 determines that shedding loads from system 10 would be beneficial, demand signaling device 98 generates demand signal 96 and transmits demand signal 96 to processor 82. Demand signal 96 may include generic instructions instructing processor 82 to shed a load. Processor 82 may include a memory 100 preprogrammed with an order in which loads, for example, loads 40, 42, and 44, are to be shed. Demand signal 96 may include more detailed instructions, for example, instructions instructing processor 82 to shed a specific load, for example, load 40. Furthermore, demand signal 96 may include a specific load shedding request, for example, an instruction instructing processor 82 to shed a specified level of electrical usage. Memory 100 may be preprogrammed with a typical energy usage of loads 40, 42, and 44, and processor 82 may be programmed to determine which loads to shed in order to meet the demand associated with demand signal 96.

In an alternative embodiment, demand signaling device 98 is controlled by a customer or a user, for example, a customer at customer location 16, 18, and/or 20 (shown in FIG. 1). In the alternative embodiment, a customer programs demand signaling device 98 with instructions as to when the customer wants loads to be shed. For example, a customer may program demand signaling device 98 with a daily schedule of when specific non-essential loads are to be shed, for example, when a pool pump or a water heater should be turned off. The customer may base this decision on tiered energy prices set by electric utility 12 (shown in FIG. 1). Although described herein as including a generic load shedding request and/or a specific load shedding request from electric utility 12, and/or a load shedding request from the customer, demand signal 96 may include any instructions/data that allow load shedding system 80 to function as described herein.

In the exemplary embodiment, in response to demand signal 96, processor 82 generates load shedding signal 94 and transmits load shedding signal 94 to at least one of load shedding apparatus 84. Processor 82 determines which of load shedding apparatus 84 to operate based on information stored in memory 100 and/or on the contents of demand signal 96. In response to load shedding signal 94, a load shedding apparatus, for example, load shedding apparatus 86, mechanically sheds a corresponding load by actuating a circuit breaker from an "on" state to an "off" state. Once load shedding apparatus 86 actuates the circuit breaker from the "on" state to the "off" state, load shedding apparatus 86 returns to a neutral position where the functionality of electrical panel 46 is not affected by the presence of load shedding apparatus 86. The functionality of electrical panel 46, and more specifically, each circuit breaker, includes positioning the circuit breaker in a first position or in a second position (e.g., an "on" state or an "off" state). For example, with load shedding apparatus 86 in the neutral position, a user may open the door of electrical panel 46, change a state of circuit breakers therein, and close the door of electrical panel 46 without any interference from load shedding apparatus 86.

As described above, load shedding system 80 facilitates shedding of an attached load. In the exemplary embodiment, load shedding system 80 also performs the operations described above to reenergize the attached load. For example, demand signal 96 may include instructions instructing processor 82 to add a load to power grid 14. Such a demand signal may be sent by electric utility 12 after peak hours, when overall energy demand is reduced to lower than a predefined level. Alternatively, a customer may program demand signaling device 98 to reenergize an attached load at a time when energy rates return to non-peak levels.

Figure 3:
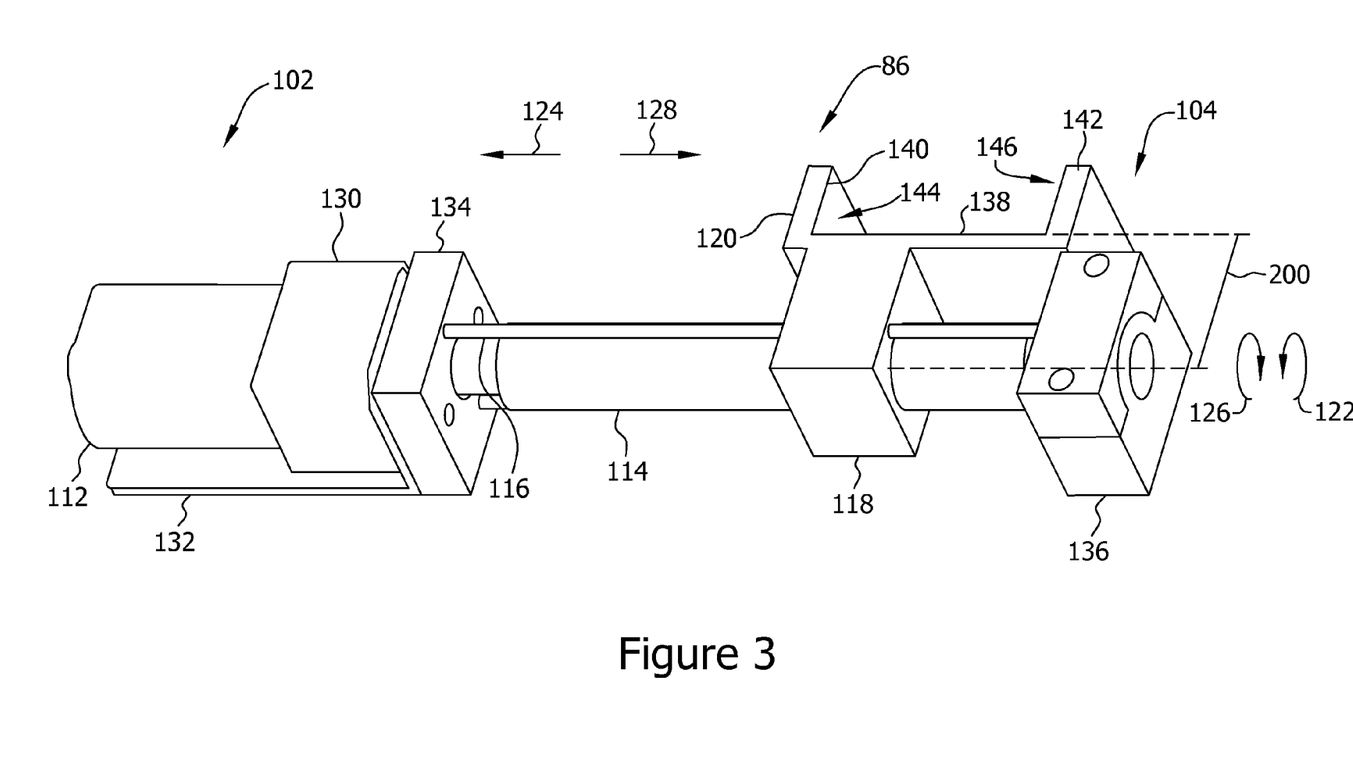
FIG. 3 is a perspective view of an exemplary load shedding apparatus that may be included within the load shedding system shown in FIG. 2.

FIG. 3 is a perspective view of load shedding apparatus 86 (shown in FIG. 2). Load shedding apparatus 86 includes a first end 102 and a second end 104. In the exemplary embodiment, load shedding apparatus 86 includes an actuator 106. In the exemplary embodiment, actuator 106 is a linear actuator that includes an electric motor 112, a first threaded member 114, at least one guide member 116, and a second threaded member 118. Although described herein as a linear actuator, actuator 106 may be any suitable type of actuator that allows load shedding apparatus 86 to function as described herein. In the exemplary embodiment, second threaded member 118 is complementary to first threaded member 114. In a specific example, first threaded member 114 is a lead screw and second threaded member 118 is a moving nut. Load shedding apparatus 86 also includes an interface member, referred to herein as a breaker handle 120. In the exemplary embodiment, breaker handle 120 is coupled to moving nut 118. In an alternative embodiment, breaker handle 120 includes moving nut 118. Moving nut 118 is operatively coupled to lead screw 114. Electric motor 112 is coupled to and configured to rotate lead screw 114. Rotating lead screw 114 in a first direction 122 (e.g., clockwise) causes moving nut 118 to translate in a first direction 124. Rotating lead screw 114 in a second direction 126 (e.g., counterclockwise), opposite to first direction 122, causes moving nut 118 to translate in a second direction 128, opposite to first direction 124. Guide member 116 includes, for example, at least one guide rod. Guide member 116 prevents moving nut 118 from rotating with respect to lead screw 114.

Load shedding apparatus 86 may also include gearing 130, for example, a gear box, that couples electric motor 112 to lead screw 114. Gearing 130 causes lead screw 114 to rotate at a lower rate than electric motor 112, but increases the torque applied by lead screw 114 on moving nut 118. Gearing 130 increases the torque to a level required to move an actuator lever of a circuit breaker (shown in FIG. 4) between positions. Gearing 130 also facilitates use of a smaller motor, while obtaining the torque level needed to move the actuator lever, therefore a more compact load shedding apparatus 86 can be produced.

Load shedding apparatus 86 may also include a mounting plate 132. Mounting plate 132 is configured to facilitate coupling load shedding apparatus 86 to a door of electrical panel 46 (shown in FIG. 4). Load shedding apparatus 86 may also include a guide couple 134, which couples guide member 116 to electric motor 112. Furthermore, load shedding apparatus 86 may include a bearing housing, for example, but not limited to, a pillow block 136. Pillow block 136 is operatively coupled to second end 104 of lead screw 114 and facilitates efficient rotation of lead screw 114.

In the exemplary embodiment, breaker handle 120 includes a base plate 138 coupled to and/or including moving nut 118. Breaker handle 120 also includes a first edge 140 extending substantially perpendicularly from first end 102 of base plate 138. Breaker handle 120 also includes a second edge 142 extending substantially perpendicularly from second end 104 of base plate 138. In the exemplary embodiment, first edge 140 is substantially parallel to second edge 142. First edge 140 and second edge 142 each include an inner surface 144 and 146, respectively.

Figure 4:
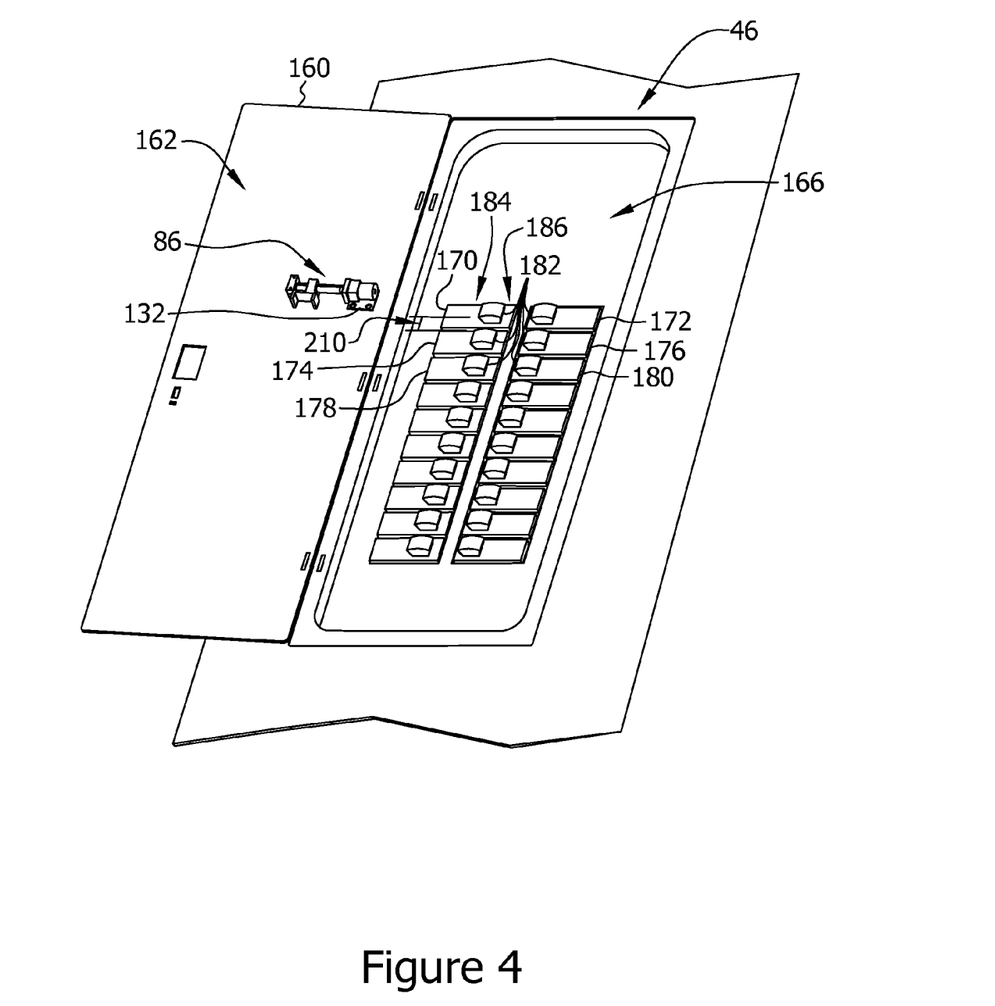
FIG. 4 is a perspective view of the load shedding apparatus shown in FIG. 3 coupled to an open electrical load center door.
Figure 5:
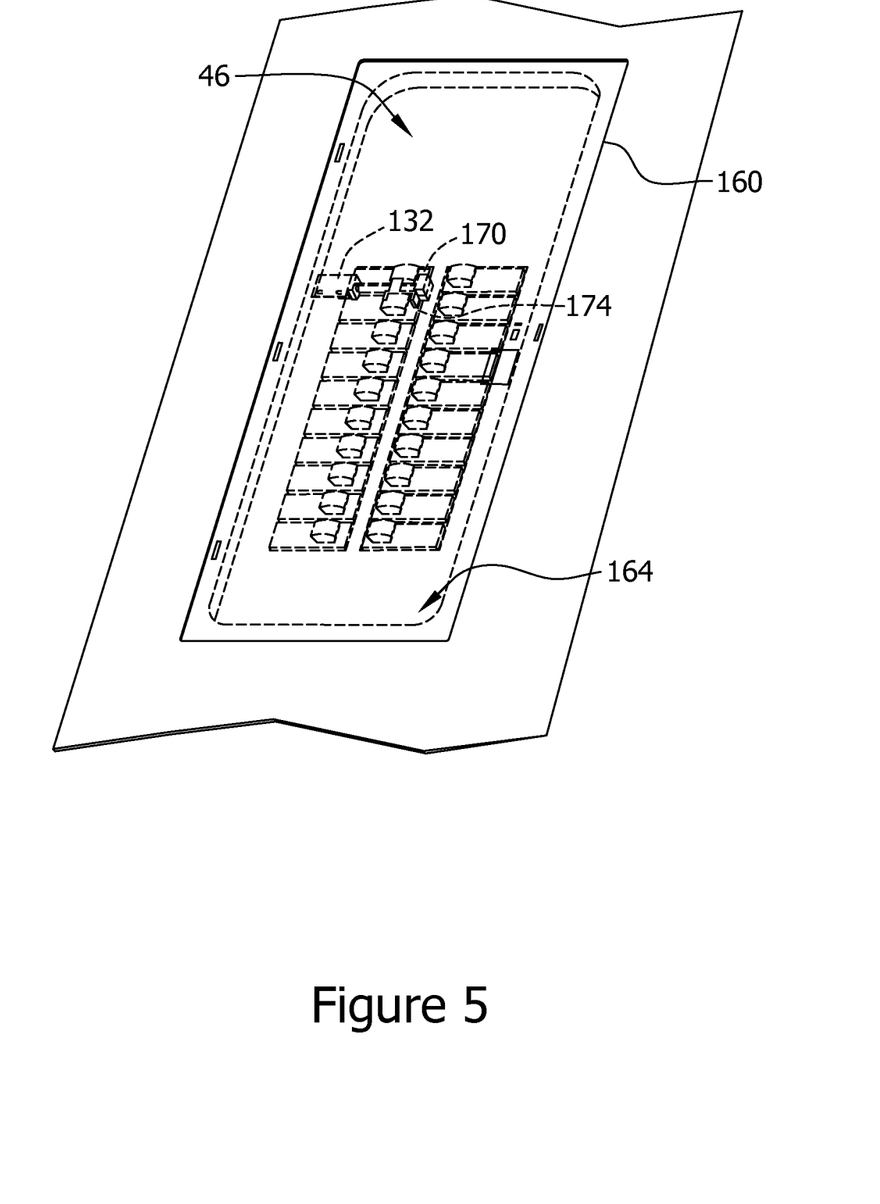
FIG. 5 is a perspective view of the load shedding apparatus shown in FIG. 3 coupled to a closed electrical load center door.

FIG. 4 is a perspective view of load shedding apparatus 86 coupled to a door 160 of electrical panel 46. Electrical panel door 160 is in an open position relative to electrical panel 46. FIG. 5 is a perspective view of load shedding apparatus 86 coupled to electrical panel door 160. In FIG. 4, door 160 is illustrated as transparent in order to show the position of load shedding apparatus 86 when door 160 is closed relative to electrical panel 46. Electrical panel door 160 includes an interior surface 162 and an exterior surface 164. When closed, door 160 and electrical panel 46 define an interior 166 of electrical panel 46, which encloses a plurality of individual circuit breakers, for example, first circuit breaker 170, second circuit breaker 172, third circuit breaker 174, fourth circuit breaker 176, fifth circuit breaker 178, and sixth circuit breaker 180. As described above, circuit breakers 170, 172, 174, 176, 178, and 180 are electrical switches that automatically operate to disconnect an electrical circuit from a power source upon the occurrence of a fault, for example, a short circuit, and also allow manual switching between an "on" state and an "off/tripped" state.

Circuit breakers 170, 172, 174, 176, 178, and 180 each include an actuator lever 182 for manual operation of the circuit breaker. Actuator lever 182 is movable between a first position 184 and a second position 186. First position 184 is referred to herein as an "on" position. Circuit breakers 170, 172, 174, 176, 178, and 180 operate as a closed circuit when in the "on" position, allowing electricity to flow from power grid 14 to loads coupled to the circuit breaker. Second position 186 is referred to herein as an "off/tripped" position. Circuit breakers 170, 172, 174, 176, 178, and 180 operate as an open circuit when in the "off/tripped" position, preventing electricity from flowing through the circuit breaker. For example, an individual circuit within customer location 16 (shown in FIG. 1) may be turned off by manually switching actuator lever 182 from "on" position 184 to "off/tripped" position 186. Furthermore, a circuit breaker that has automatically switched from "on" position 184 to "off/tripped" position 186 due to current drawn by loads coupled to the circuit breaker exceeding a predefined current level, may be reset by a user by manually switching actuator lever 182 from "off/tripped" position 186 to "on" position 184.

In the exemplary embodiment, mounting plate 132 is coupled to interior surface 162 of door 160 and facilitates coupling load shedding apparatus 86 to door 160. Load shedding apparatus 86 may be coupled to door 160 using a fastener such as, but not limited to, a screw or an adhesive (not shown in FIG. 3).

In the exemplary embodiment, when door 160 is closed (shown in FIG. 5), portions of load shedding apparatus 86 fit between circuit breakers, for example, between first circuit breaker 170 and third circuit breaker 174. More specifically, base plate 138 and moving nut 118 have a thickness 200 (shown in FIG. 3) that is less than a distance 210 (shown in FIG. 4) between actuator lever 182 of first circuit breaker 170 and actuator lever 182 of third circuit breaker 174.

Figure 6:
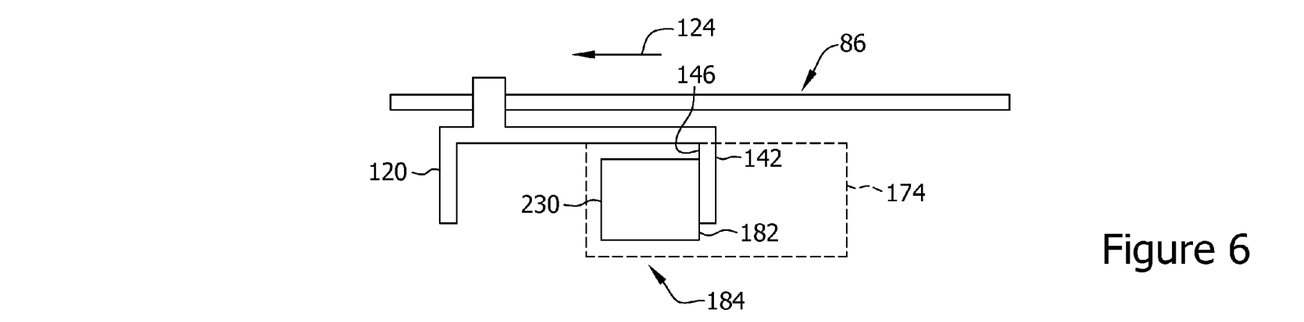
FIG. 6 is a top view of the load shedding apparatus shown in FIG. 3 positioned in a first position.

FIG. 6 is a top view of actuator lever 182 of third circuit breaker 174 positioned in first position 184. In the exemplary embodiment, breaker handle 120 is translated in first direction 124 through operation of load shedding apparatus 86. Inner surface 146 of second edge 142 forces actuator lever 182 into first position 184 (e.g., "on" position).

Figure 7:
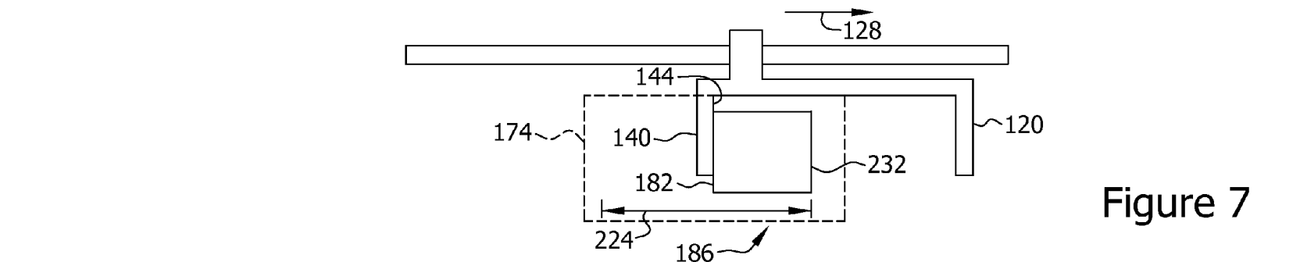
FIG. 7 is a top view of the load shedding apparatus shown in FIG. 3 positioned in a second position.

FIG. 7 is a top view of actuator lever 182 of third circuit breaker 174 positioned in second position 186. In the exemplary embodiment, breaker handle 120 is translated in second direction 128 through operation of load shedding apparatus 86. Inner surface 144 of first edge 140 forces actuator lever 182 into second position 186 (e.g., "off/tripped" position).

Load shedding apparatus 86 ensures that actuator lever 182 is in a position requested in load shedding signal 94 (shown in FIG. 2). If load shedding signal 94 directs load shedding apparatus 86 to switch third circuit breaker 174 to "on" position 184, and third circuit breaker 174 is already in "on" position 184, load shedding apparatus 86 will still translate breaker handle 120 in first direction 124, ensuring that third circuit breaker 174 is in "on" position 184. Similarly, if load shedding signal 94 directs load shedding apparatus 86 to switch third circuit breaker 174 to "off/tripped" position 186, and third circuit breaker 174 is already in "off/tripped" position 186, load shedding apparatus 86 will still translate breaker handle 120 in second direction 128, ensuring that third circuit breaker 174 is in "off/tripped" position 186.

Figure 8:
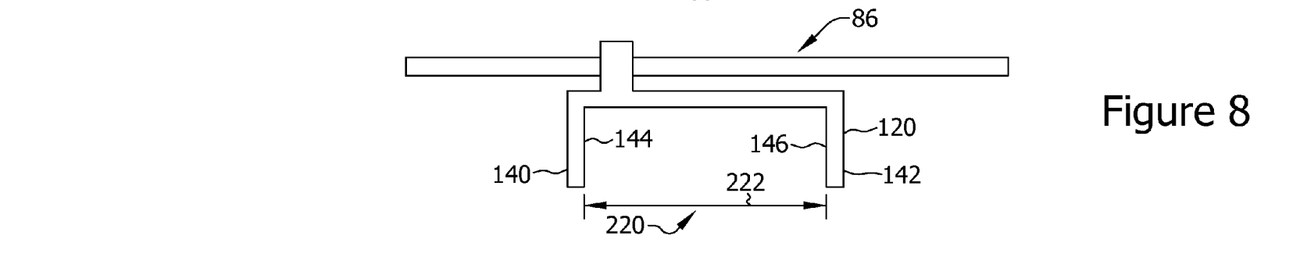
FIG. 8 is a top view of the load shedding apparatus shown in FIG. 3 positioned in a neutral position.

FIG. 8 is a top view of load shedding apparatus 86 in a neutral position 220. In the exemplary embodiment, after load shedding apparatus 86 translates breaker handle 120 to either first position 184 (shown in FIG. 6) or second position 186 (shown in FIG. 7), load shedding apparatus 86 returns breaker handle 120 to neutral position 220. In the exemplary embodiment, a distance 222 between inner surface 144 of first edge 140 and inner surface 146 of second edge 142 corresponds to a distance 224 between a first edge 230 (shown in FIG. 6) of breaker lever 182 in "on" position 184 and a second edge 232 (shown in FIG. 7) of breaker lever 182 in "off/tripped" position 186. For example, distance 222 is greater than distance 224. Distance 224 between first edge 230 of breaker lever 182 in position 184 and second edge 232 of breaker lever 182 in position 186 is also referred to herein as a throw distance of circuit breaker 174. Returning breaker handle 120 to neutral position 220, and configuring first edge 140 and second edge 142 to span distance 222, facilitates preventing load shedding apparatus 86 from interfering with typical operation of electrical panel 46. In a specific example, when door 160 is closed, breaker handle 120 of third circuit breaker 174 is in "off/tripped" position 186. A user may decide they would like to manually return third circuit breaker 174 to "on" position 184. The user opens door 160 and physically switches breaker handle 120 to "on" position 184. Even though actuator lever 182 was in "off/trip" position 186 when the user opened door 160 and was switched to "on" position 184, door 160 closes without interference between load shedding apparatus 86 and actuator lever 182, or between load shedding apparatus 86 and any other component within interior 166 of electrical panel 46.

Figure 9:
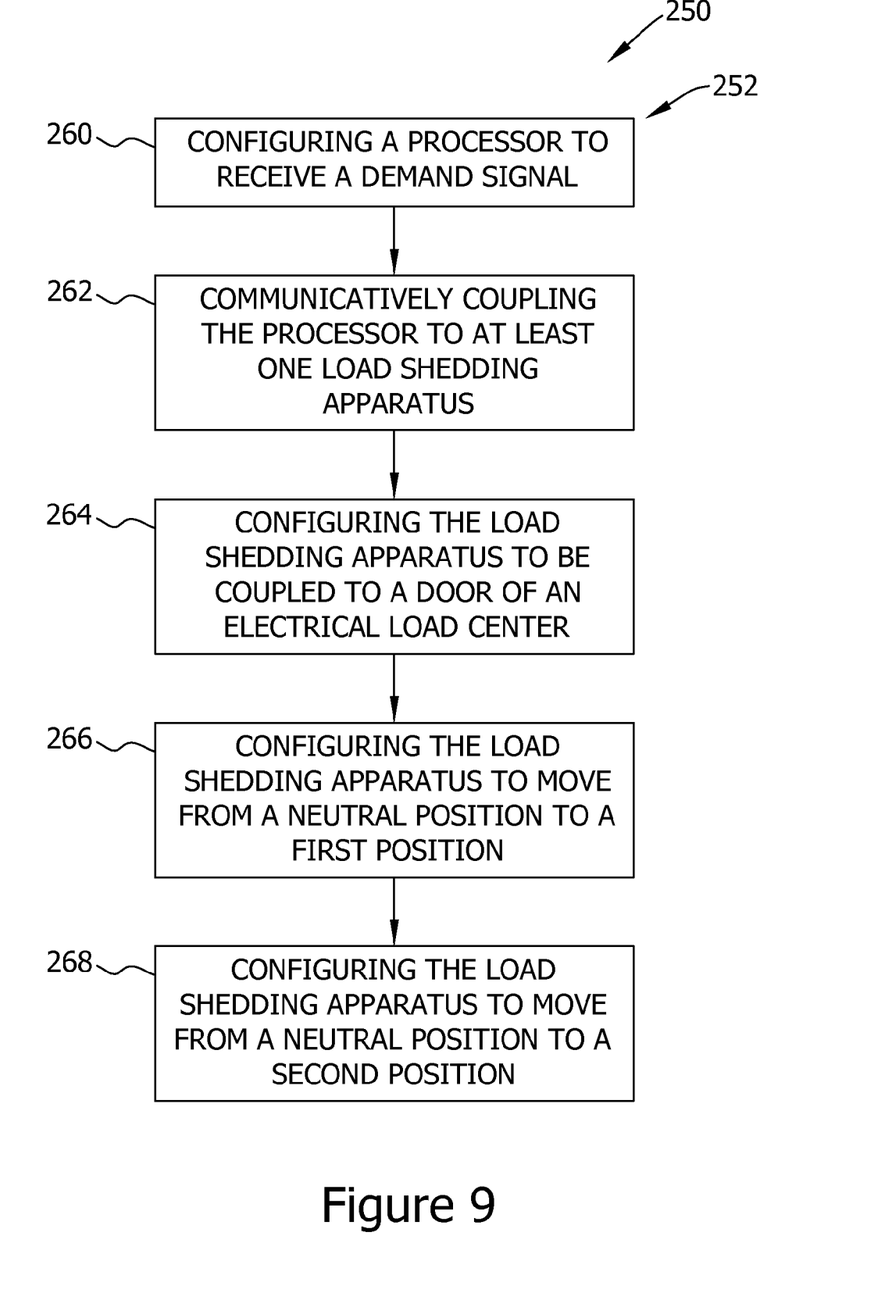
FIG. 9 is a flow chart of an exemplary method for retrofitting an electrical load center with the load shedding system shown in FIG. 2.

FIG. 9 is a flow chart 250 of an exemplary method 252 for retrofitting an electrical load center, for example, electrical load center 46 (shown in FIG. 2) to include load shedding system 80 (shown in FIG. 2). In the exemplary embodiment, method 252 includes configuring 260 a processor, for example, processor 82 (shown in FIG. 2), to receive a demand signal from a demand signaling device, for example, demand signaling device 98 that provides a demand response signal, for example, demand response signal 96 (shown in FIG. 2) to processor 82. Configuring 260 may include coupling processor 82 to demand signaling device 98 using an electrical wire or other communication cable. Configuring 260 may also include communicatively coupling processor 82 and demand signaling device 98 using, for example, cellular technology. Processor 82 is coupled to at least one of an electric utility, for example, electric utility 12 (shown in FIG. 1), that provides demand response signal 96 to the processor and a customer location demand signaling device.

Method 252 also includes communicatively coupling 262 processor 82 to at least one load shedding apparatus, for example, load shedding apparatus 86. Method 252 also includes configuring 264 load shedding apparatus 86 to be coupled to a door, for example, door 160 (shown in FIG. 4) of an electrical load center, for example, electrical panel 46 (shown in FIG. 4). Load shedding apparatus 86 is coupled to door 160 in such a manner that when door 160 is closed, load shedding apparatus 86 is operatively coupled to at least one circuit breaker switch within electrical panel 46. Furthermore, load shedding apparatus 86 is configured 264 to be coupled to door 160 in such a manner that load shedding system 80 does not interfere with normal functionality of electrical panel 46. For example, a user may open door 160, change the position of actuator levers 182 (shown in FIG. 4) of any of the circuit breakers included in electrical panel 46, and close door 160 without interference from load shedding apparatus 86 or any component of load shedding system 80.

Method 252 also includes configuring 266 load shedding apparatus 86 to move from a neutral position, for example, neutral position 220 (shown in FIG. 8) to a second position, for example, second position 186 (shown in FIG. 7) in response to a load shedding signal, for example, load shedding signal 94 (shown in FIG. 2) from processor 82. Since breaker handle 120 (shown in FIG. 4) of load shedding apparatus 86 is operatively coupled to actuator lever 182, translating breaker handle 120 from neutral position 220 to second position 186, ensures that actuator lever 182 is also in second position 186. In the exemplary embodiment, second position 186 corresponds to an "off/tripped" state of circuit breaker 174. Configuring 266 load shedding apparatus 86 further comprises configuring load shedding apparatus 86 to return to neutral position 220 after reaching second position 186.

Method 252 also includes configuring 268 load shedding apparatus 86 to move from neutral position 220 to a first position, for example first position 184 (shown in FIG. 6) in response to load shedding signal 94 from processor 82. In this case, load shedding signal 94 is a reenergizing signal. Since breaker handle 120 (shown in FIG. 4) of load shedding apparatus 86 is operatively coupled to actuator lever 182, translating breaker handle 120 from neutral position 220 to first position 184, ensures that actuator lever 182 is also in first position 184. In the exemplary embodiment, first position 184 corresponds to an "on" state of circuit breaker 174. Configuring 268 load shedding apparatus 86 further comprises configuring load shedding apparatus 86 to return to neutral position 220 after reaching first position 184.

Described herein are exemplary methods, systems, and apparatus for disconnecting a load from an electrical power distribution system. More specifically, the methods, systems, and apparatus described herein facilitate retrofitting an electrical load center with load shedding apparatus that changes a state of circuit breakers by mechanically moving the circuit breaker actuator levers to a directed state. The methods, systems, and apparatus described herein return a breaker handle to a neutral position after a load shedding movement is complete so that load shedding apparatus does not interfere with normal operation (e.g., manual operation) of the electrical load center. The coupling of load shedding apparatus to electrical load center door allows the load shedding system to adhere to electrical codes that require that such a system not interfere with normal operation of the electrical load center (e.g., codes that require that the system not restrict access to actuator levers). Coupling load shedding apparatus to electrical load center door also allows any wires leading to load shedding apparatus to be kept separate from incoming voltage lines leading into the electrical load center. The methods, systems, and apparatus described herein also facilitate controlling a state of a circuit breaker without an installation that requires uncoupling the circuit breaker from an electric supply, which is a job that may require considerably more labor and more costly equipment. For example, the load shedding apparatus may be installed within the electrical load center while circuit breakers are coupled to the electric supply. The small size of the load shedding apparatus facilitates providing every circuit breaker actuator handle with a separate load shedding apparatus. Moreover, the small size of the load shedding apparatus facilitates use of more than one load shedding apparatus to actuate an actuator lever that requires more force to move than load shedding apparatus is able to provide.

The methods, systems, and apparatus described herein facilitate efficient and economical shedding of loads from an electrical grid. Exemplary embodiments of methods, systems, and apparatus are described and/or illustrated herein in detail. The methods, systems, and apparatus are not limited to the specific embodiments described herein, but rather, components of each system and apparatus, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A load shedding system for operating at least one circuit breaker positioned within an enclosure, said load shedding system comprising
    a processor configured to receive a demand signal and to provide a predetermined load shedding signal; and
    at least one load shedding apparatus configured to receive the load shedding signal from said processor, said load shedding apparatus comprising an interface member and an actuator configured to be coupled to a door of the enclosure and configured to translate said interface member, the door moveable between a first door position and a second door position, said interface member configured to be operatively coupled to the at least one circuit breaker, when the door is in the first door position.

2. A system in accordance with claim 1 wherein the demand signal comprises at least one of a demand signal provided by an electric utility and a demand signal provided by a user.

3. A system in accordance with claim 1 wherein, in response to the load shedding signal from said processor, said actuator is configured to translate said interface member from a neutral position to a first position.

4. A system in accordance with claim 1 wherein the enclosure comprises an electrical load center.

5. A load shedding apparatus for operating at least one circuit breaker positioned within an enclosure, the enclosure comprising a door, said load shedding apparatus comprising;
    an interface member comprising a first edge and a second edge; and
    an actuator coupled to said interface member and configured to translate said interface member from a neutral position to a first position in response to a load shedding signal, wherein said actuator is coupled to the door, the door moveable between a first door position and a second door position, said interface member configured to be operatively coupled to the at least one circuit breaker when the door is in the first door position.

6. An apparatus in accordance with claim 5 wherein said actuator is further configured to translate said interface member from the neutral position to a second position, wherein the neutral position is between the first position and the second position.

7. An apparatus in accordance with claim 6 wherein said actuator is configured to translate said interface member from the neutral position to the second position in response to a reenergizing signal.

8. An apparatus in accordance with claim 6 wherein said actuator is configured to switch said at least one circuit breaker from an "off" position to an "on" position by translating said interface member from the neutral position to the second position.

9. An apparatus in accordance with claim 5 wherein the first door position is a closed position and the second door position is an open position.

10. An apparatus in accordance with claim 9 wherein said actuator is configured to return said interface member to the neutral position after translating said interface member to the first position.

11. An apparatus in accordance with claim 5 wherein said first edge is a first distance from said second edge, the first distance corresponding to a throw distance of the at least one circuit breaker.

12. An apparatus in accordance with claim 5 wherein said actuator is configured to switch said at least one circuit breaker from an "on" position to an "off" position by translating said interface member from the neutral position to the first position.

13. An apparatus in accordance with claim 5 wherein said actuator comprises an electric motor coupled to, and configured to turn, a first threaded member.

14. An apparatus in accordance with claim 13 wherein said interface member further comprises a second threaded member complementary to said first threaded member, said second threaded member configured to couple said first threaded member to said interface member.

15. An apparatus in accordance with claim 13 wherein said actuator further comprises gearing configured to cause said first threaded member to rotate at a lower rate than said motor.

16. An apparatus in accordance with claim 5 further comprising a guide member configured to maintain an orientation of said interface member with respect to said actuator.

17. An apparatus in accordance with claim 16 wherein said guide member comprises at least one guide rod.

18. A method for retrofitting an electrical load center with a load shedding system, the load shedding system including a processor and at least one load shedding apparatus that includes an interface member and an actuator configured to translate the interface member, said method comprising:
   configuring the processor to receive a demand signal;
   communicatively coupling the processor to the at least one load shedding apparatus; and
   configuring the actuator to be coupled to a door of the electrical load center, the door moveable between a first door position and a second door position, the actuator configured to be coupled to the door such that when the door is in the first door position, the interface member is operatively coupled to at least one circuit breaker within the electrical load center.

19. A method in accordance with claim 18 further comprising configuring the at least one load shedding apparatus to:
   move the interface member from a neutral position to a first position in response to a load shedding signal from the processor; and
   return the interface member to the neutral position.

20. A method in accordance with claim 19 further comprising configuring the at least one load shedding apparatus to:
   move the interface member from the neutral position to a second position in response to a reenergizing signal from the processor; and
   return the interface member to the neutral position.

21. A method in accordance with claim 18 further comprising configuring the processor to receive the demand response signal from at least one of an electric utility and a user demand signaling device.

\* \* \* \* \*

UNITED STATES PATENT AND TRADEMARK OFFICE
CERTIFICATE OF CORRECTION

| | | |
|---|---|---|
| PATENT NO. | : 8,666,520 B2 | Page 1 of 1 |
| APPLICATION NO. | : 12/902814 | |
| DATED | : March 4, 2014 | |
| INVENTOR(S) | : Kucinskas et al. | |

It is certified that error appears in the above-identified patent and that said Letters Patent is hereby corrected as shown below:

In the Claims

In Column 10, Line 16, in Claim 1, delete "comprising" and insert -- comprising: --, therefor.

In Column 10, Line 40, in Claim 5, delete "comprising;" and insert -- comprising: --, therefor.

Signed and Sealed this
Twenty-fourth Day of June, 2014

Michelle K. Lee
*Deputy Director of the United States Patent and Trademark Office*